(12) United States Patent
Yoshikawa et al.

(10) Patent No.: US 12,474,296 B2
(45) Date of Patent: Nov. 18, 2025

(54) GAS SENSOR

(71) Applicant: DENSO CORPORATION, Kariya (JP)

(72) Inventors: Tatsuya Yoshikawa, Kariya (JP); Yusuke Todo, Kariya (JP); Mitsunobu Nakato, Kariya (JP); Takashi Araki, Kariya (JP); Yuji Kawasaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 877 days.

(21) Appl. No.: 17/313,320

(22) Filed: May 6, 2021

(65) Prior Publication Data

US 2021/0255137 A1 Aug. 19, 2021

Related U.S. Application Data

(63) Continuation of application No. PCT/JP2019/042850, filed on Oct. 31, 2019.

(30) Foreign Application Priority Data

Nov. 9, 2018 (JP) ................... 2018-211161

(51) Int. Cl.
*G01N 27/417* (2006.01)
*G01N 27/406* (2006.01)
(Continued)

(52) U.S. Cl.
CPC ....... *G01N 27/417* (2013.01); *G01N 27/4071* (2013.01); *G01N 27/406* (2013.01);
(Continued)

(58) Field of Classification Search
CPC ............ G01N 27/417; G01N 27/4071; G01N 27/4065; G01N 27/4078; G01N 33/0037;
(Continued)

(56) References Cited

U.S. PATENT DOCUMENTS 6,890,422 B1* 5/2005 Stanglmeier ......... G01N 27/417
205/780.5
2001/0023823 A1 9/2001 Takahashi et al.
(Continued)

FOREIGN PATENT DOCUMENTS

JP 2016-008831 1/2016

*Primary Examiner* — James Lin
*Assistant Examiner* — Sommer Yousef Osman
(74) *Attorney, Agent, or Firm* — Nixon & Vanderhye P.C.

(57) ABSTRACT

A gas sensor includes a sensor element including a solid electrolyte, a gas chamber, a pump electrode, a sensor electrode, and a reference electrode. The pump electrode and sensor electrode are provided in the solid electrolyte in a state in which the pump electrode and the sensor electrode are housed in the gas chamber. The reference electrode is provided in the solid electrolyte. The pump electrode and the sensor electrode contain Au. Au content in a surface layer is equal to or greater than 1 mass % and higher than Au content in a reference layer. The surface layer is an area from a surface of the sensor electrode to a depth of 0.3 nanometers. The reference layer is an area located at depths ranging from 2 or more to 3 or less nanometers beneath the surface of the sensor electrode.

10 Claims, 8 Drawing Sheets

(51) Int. Cl.
*G01N 27/407* (2006.01)
*G01N 33/00* (2006.01)

(52) U.S. Cl.
CPC ..... *G01N 27/4065* (2013.01); *G01N 27/4078* (2013.01); *G01N 33/0037* (2013.01)

(58) Field of Classification Search
CPC ....... G01N 27/4075; G01N 27/406–41; G01N 33/0004–0075
See application file for complete search history.

(56) References Cited

U.S. PATENT DOCUMENTS

| | | |
|---|---|---|
| 2003/0106795 A1 | 6/2003 | Katafuchi et al. |
| 2004/0069629 A1* | 4/2004 | Tanaka ................. G01N 27/419 204/426 |
| 2017/0138893 A1* | 5/2017 | Nakayama ......... G01N 27/4075 |
| 2017/0219516 A1* | 8/2017 | Toudou .............. G01N 27/4075 |
| 2018/0011051 A1* | 1/2018 | Okamoto ........... G01N 27/4074 |

* cited by examiner

GAS SENSOR

CROSS-REFERENCE TO RELATED APPLICATIONS

The present application is a continuation application of International Application No. PCT/JP2019/042850, filed on Oct. 31, 2019, which claims priority to Japanese Patent Application No. 2018-211161, filed on Nov. 9, 2018. The contents of these applications are incorporated herein by reference in their entirety.

BACKGROUND

Technical Field

The present disclosure relates to a gas sensor that includes a sensor element.

Related Art

For example, a gas sensor is arranged in an exhaust pipe of an internal combustion engine, and is used to detect an air-fuel ratio or a concentration of a specific gas component, such as oxygen, $NO_X$ (nitrogen oxide), or ammonia, in a gas to be detected, the gas to be detected being exhaust gas that flows through the exhaust pipe. A sensor element of the gas sensor includes a solid electrolyte that has oxygen ion conductivity and a pair of electrodes that are provided in positions that overlap each other on both surfaces of the solid electrolyte.

SUMMARY

A first aspect of the present disclosure provides a gas sensor that includes a sensor element. The sensor element includes: a solid electrolyte that has ion conductivity; a gas chamber that is formed so as to be adjacent to a surface of the solid electrolyte and into which a gas to be detected is introduced; a pump electrode that is provided on a surface of the solid electrolyte in a state in which the pump electrode is housed inside the gas chamber; and a sensor electrode that is provided on a surface of the solid electrolyte in a state in which the sensor electrode is housed inside the gas chamber. Au content in a surface layer is equal to or greater than 1 mass % and higher than Au content in a reference layer. The surface layer is an area from a surface of the sensor electrode to a depth of 0.3 nanometers. The reference layer is an area located at depths ranging from 2 or more to 3 or less nanometers beneath the surface of the sensor electrode.

BRIEF DESCRIPTION OF THE DRAWINGS

In the accompanying drawings:
accompanying drawings. The drawings of the present disclosure are as follows.

DESCRIPTION OF THE EMBODIMENTS

Figure 1:
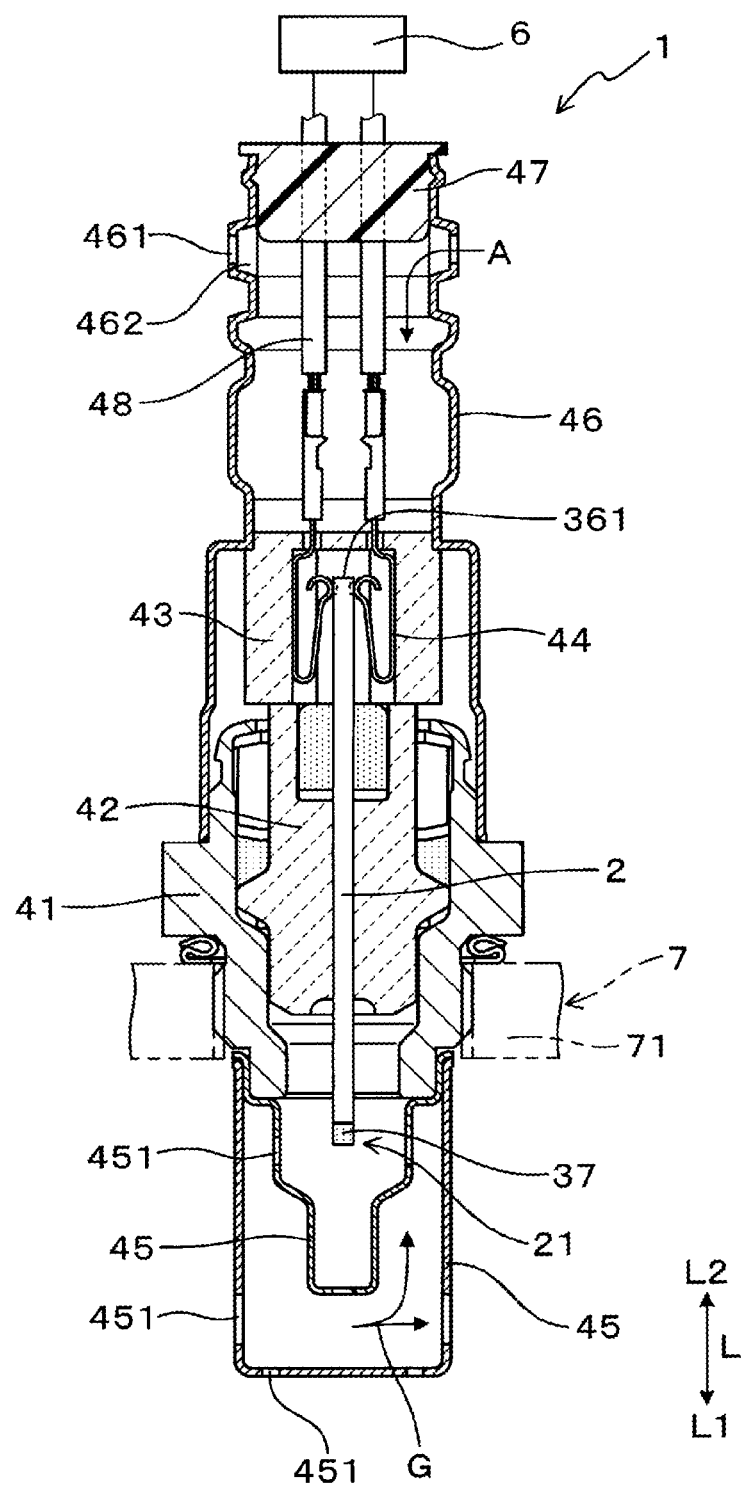
FIG. 1 is an explanatory diagram of a cross-section of a gas sensor according to a first embodiment.

For example, in a $NO_X$ sensor that detects $NO_X$ as the specific gas component in the gas to be detected, an amount of $NO_X$ that is contained in the gas to be detected is detected after oxygen that is contained in the gas to be detected is discharged. Specifically, on a surface of the solid electrolyte that is exposed to the gas to be detected, a pump electrode for adjusting the oxygen concentration in the gas to be detected and a sensor electrode for detecting the $NO_X$ concentration in the gas to be detected are provided. In addition, on a surface of the solid electrolyte that is exposed to atmospheric air that serves as a reference gas, a reference electrode is provided. Furthermore, Au that is inert to $NO_X$ is added to the pump electrode. Rh that is active against $NO_X$ is added to the sensor electrode.

In addition, for example, regarding a gas sensor element in JP-A-2003-177111, it is described that a pump electrode and a sensor electrode (gas-to-be-measured-side electrode) that are provided on a surface of a solid electrolyte that is exposed to a gas to be measured contain Au and the like, in addition Pt and the like. Furthermore, when the sensor element is exposed to a high-temperature exhaust gas, even should Au and the like that scatter from the pump electrode become attached to the sensor electrode, because the sensor electrode already contains Au and the like, detection accuracy regarding $NO_X$ and the like using the sensor electrode when the gas sensor element is used over a long period does not easily change.

As a result of research and development by the inventors, it has become clear that, as factors that worsen the detection accuracy regarding $NO_X$ during use of a sensor element of a gas sensor, a following factor is present, in addition to Au that scatters from the pump electrode attaching to the sensor electrode. That is, it has been found that, when the sensor electrode contains Au, the detection accuracy regarding $NO_X$ worsens as a result of Au being deposited from inside the sensor electrode toward a surface side, as well.

In the sensor electrode of the gas sensor element in JP-A-2003-177111, Au and the like are assumed to be evenly contained in substantially the overall sensor electrode. In this case, when usage time of the gas sensor increases, Au and the like that are contained inside the sensor element may be deposited toward the surface side. Au content and the like on the surface side of the sensor electrode may increase. Therefore, output sensitivity of the sensor electrode to $NO_X$ may worsen as the usage time of the gas sensor elapses. The detection accuracy regarding $NO_X$ using the sensor electrode may change in a worsening direction.

It is thus desired to provide a gas sensor in which detection accuracy regarding a specific gas component can be made less prone to deteriorating, and a manufacturing method thereof.

A first exemplary embodiment of the present disclosure provides a gas sensor that includes a sensor element. The sensor element includes: a solid electrolyte that has ion conductivity; a gas chamber that is formed so as to be adjacent to a surface of the solid electrolyte and into which a gas to be detected is introduced; a pump electrode that is provided on a surface of the solid electrolyte in a state in which the pump electrode is housed inside the gas chamber; and a sensor electrode that is provided on a surface of the solid electrolyte in a state in which the sensor electrode is housed inside the gas chamber. The pump electrode and the sensor electrode contain Au. Au content in a surface layer is equal to or greater than 1 mass % and higher than Au content in a reference layer. The surface layer is an area from a surface of the sensor electrode to a depth of 0.3 nanometers. The reference layer is an area located at depths ranging from 2 or more to 3 or less nanometers beneath the surface of the sensor electrode.

A second exemplary embodiment of the present disclosure provides a manufacturing method for a gas sensor. The gas sensor includes: a sensor element that includes a solid electrolyte that has ion conductivity; a gas chamber that is formed so as to be adjacent to a surface of the solid electrolyte and into which a gas to be detected is introduced; a pump electrode that is provided on a surface of the solid electrolyte in a state in which the pump electrode is housed inside the gas chamber; a sensor electrode that is provided on a surface of the solid electrolyte in a state in which the sensor electrode is housed inside the gas chamber; and a reference electrode that is provided on a surface of the solid electrolyte.

The manufacturing method includes: a firing step of firing a sheet of the solid electrolyte on which a paste material for the pump electrode that contains Au, a paste material for the sensor electrode that contains Pt, Rh, and Au, and a paste material for the reference electrode are provided; an energization step of performing energization between the sensor electrode and the reference electrode; and a reoxidation step of replenishing the solid electrolyte with oxygen and causing Au to be deposited from inside the sensor electrode toward a surface side. In the reoxidation step, Au content in a surface layer is equal to or greater than 1 mass % and higher than Au content in a reference layer. The surface layer is an area from a surface of the sensor electrode to a depth of 0.3 nanometers. The reference layer is an area located at depths ranging from 2 or more to 3 or less nanometers beneath the surface of the sensor electrode.

In the gas sensor according to the first exemplary embodiment, through use of the sensor element in which the pump electrode and the sensor electrode contain Au, a special modification is made to a distribution state of Au in the sensor electrode. Specifically, the Au content in the surface layer of the sensor electrode is equal to or greater than 1 mass % and is higher than the Au content in the reference layer of the sensor electrode.

The surface layer indicates a layer that configures an area from the surface of the sensor electrode to a depth of 0.3 nm and indicates an area of depth from a topmost surface in a measurement section when the Au content in the sensor electrode is measured. In addition, the reference layer indicates a layer that configures an area that serves as reference to indicate that the Au content in the surface layer is higher than the Au content in a position that is deeper than the surface layer, and is a layer that configures an area located at depths ranging from 2 or more to 3 or less nm beneath the surface of the sensor electrode.

As a result of the surface layer of the sensor electrode containing Au that is 1 mass % or more and Au being unevenly distributed in large amounts in the surface layer of the sensor electrode in advance, Au does not easily move from inside the sensor electrode toward a surface side during use of the gas sensor. Consequently, output sensitivity of the sensor electrode to a specific gas component can be made less prone to deteriorating from an initial use of the gas sensor to after a predetermined period of use.

Therefore, as a result of the gas sensor according to the above-described aspect, detection accuracy regarding a specific gas component can be made less prone to deteriorating.

In the manufacturing method for a gas sensor according to the second exemplary embodiment, the gas sensor according to the above-described aspect in which the Au content in the surface layer is higher than the Au content in the reference layer is manufactured by the firing step, the energization step, and the reoxidation step being performed. In particular, when the reoxidation step is performed, the solid electrolyte is replenished with oxygen and Au is deposited from inside the sensor electrode toward the surface side. The Au content in the surface layer of the sensor electrode is equal to or greater than 1 mass % and is higher than the Au content in the reference layer of the sensor electrode.

Therefore, as a result of the manufacturing method for a gas sensor according to the second exemplary embodiment, a gas sensor in which detection accuracy regarding a specific gas component can be made less prone to deteriorating, can be manufactured.

Here, reference numbers in parentheses of the constituent elements according to aspects of the present disclosure indicate corresponding relationships with reference numbers in the drawings according to the embodiments, but do not limit the constituent elements to only the contents according to the embodiments.

Embodiments of the gas sensor and the manufacturing method thereof, described above, will be described with reference to the drawings.

First Embodiment

As shown in FIGS. 1 to 4, a gas sensor 1 according to a present embodiment includes a sensor element 2 for detecting a concentration of $NO_X$ as a specific gas component. The sensor element 2 includes a solid electrolyte 31, a gas chamber 35, a pump electrode 311, a sensor electrode 312, and a reference electrode 314.

The solid electrolyte 31 has ion conductivity. The gas chamber 35 is formed so as to be adjacent to a first surface 301 of the solid electrolyte 31 and into which a gas to be detected G is introduced. The pump electrode 311 is provided on the first surface 301 of the solid electrolyte 31 in a state in which the pump electrode 311 is housed inside the gas chamber 35. The sensor electrode 312 is provided on the first surface 301 of the solid electrolyte 312 in a state in which the sensor electrode 312 is housed inside the gas chamber 35. The reference electrode 314 is provided on a second surface 302 on a side opposite the first surface 301 of the solid electrolyte 31.

Figure 5:
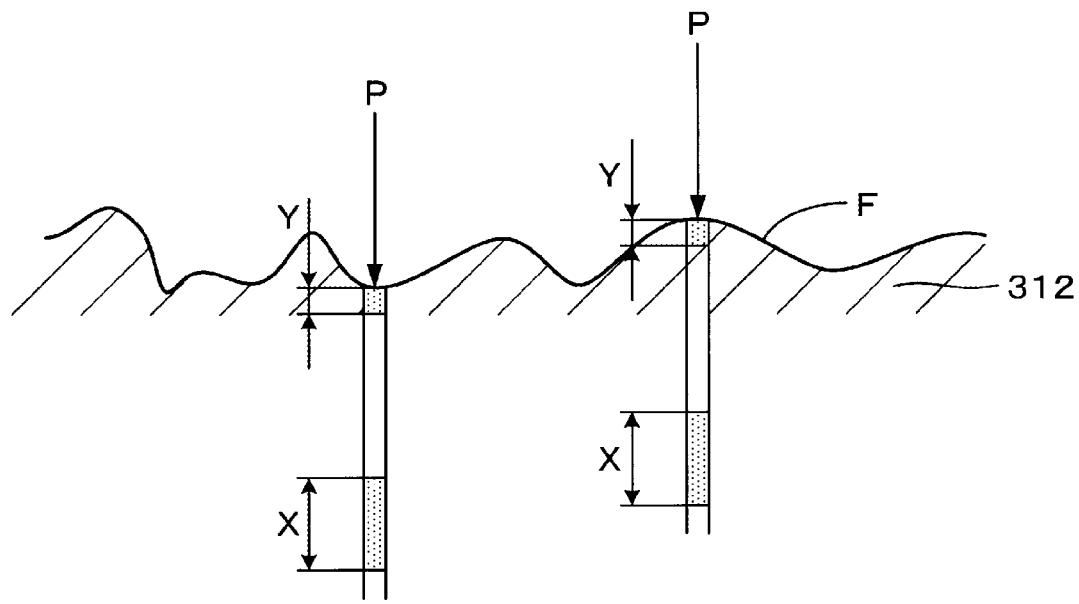
FIG. 5 is an explanatory diagram of a surface layer and a reference layer of a sensor electrode of the sensor element according to the first embodiment.

The pump electrode 311 and the sensor electrode 312 contain Au. As shown in FIG. 5, in the sensor electrode 312, Au content in a surface layer Y that is an area from a surface F of the sensor electrode 312 to a depth of 0.3 nm is equal to or greater than 1 mass %, and is higher than Au content in a reference layer X that is an area located at depths ranging from 2 or more to 3 or less nm beneath the surface F of the sensor electrode 312.

The gas sensor 1 and a manufacturing method thereof according to the present embodiment will be described in detail below.

(Gas Sensor 1)

As shown in FIG. 1, the gas sensor 1 configures a $NO_X$ sensor and is arranged in an attachment opening 71 of an exhaust pipe 7 of an internal combustion engine (engine) of a vehicle. The gas sensor 1 is used to detect the concentration of $NO_X$ (nitrogen oxide), such as NO and NO2, that serves as the specific gas component in the gas to be detected G, the gas to be detected G being exhaust gas that flows through the exhaust pipe 7. In addition, the gas sensor 1 can be used in various applications in which the concentration of a specific gas component other than $NO_X$ is determined.

In the exhaust pipe 7, a catalyst for purifying $NO_X$, HC (hydrocarbon), CO (carbon monoxide), and the like that are toxic substances in the exhaust gas is arranged in the exhaust pipe 7. The gas sensor 1 can be arranged on either an upstream side or a downstream side of the catalyst in a flow direction of the exhaust gas in the exhaust pipe 7. In particular, the gas sensor 1 according to the present embodiment can be arranged on the upstream side of the catalyst as the $NO_X$ sensor and quantitatively determine the concentration of $NO_X$ in the exhaust gas that flows to the catalyst.

(Sensor Element 2)

Figure 2:
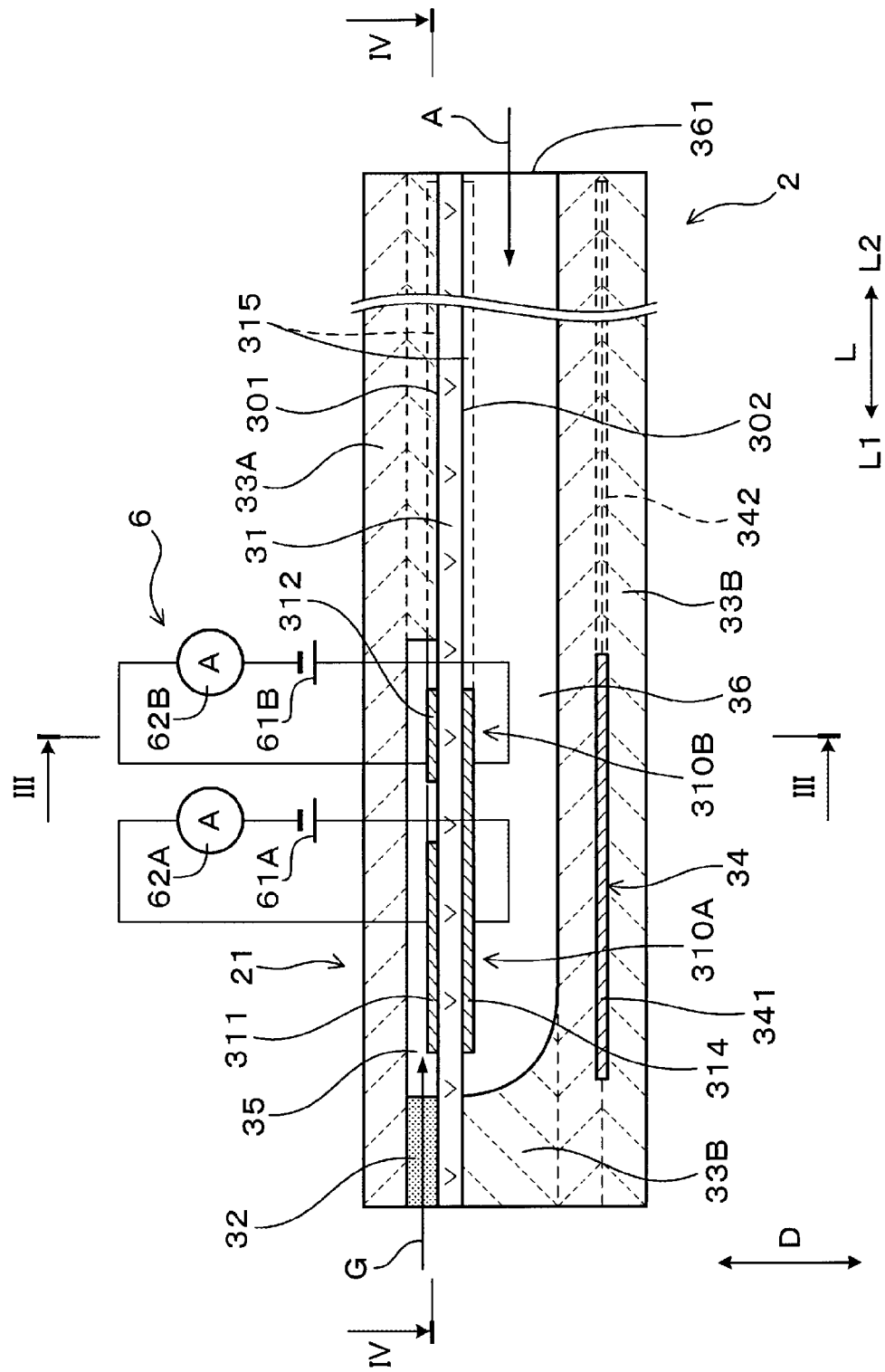
FIG. 2 is a cross-sectional view of a sensor element of the gas sensor according to the first embodiment.
Figure 3:
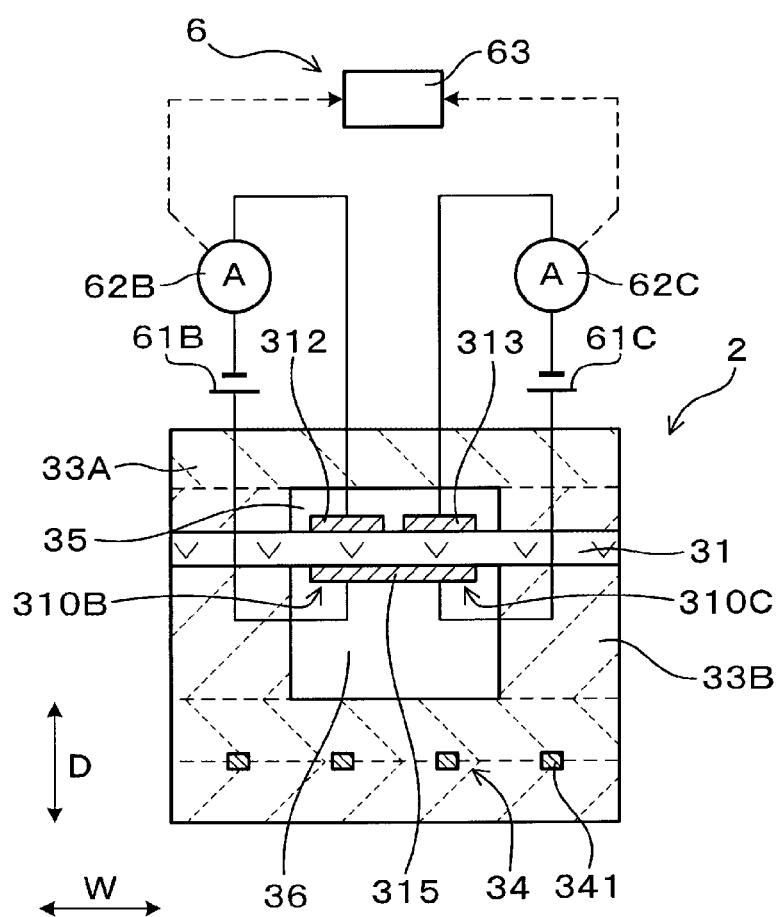
FIG. 3 is cross-sectional view of the sensor element according to the first embodiment, taken along III-III in FIG. 2.
Figure 4:
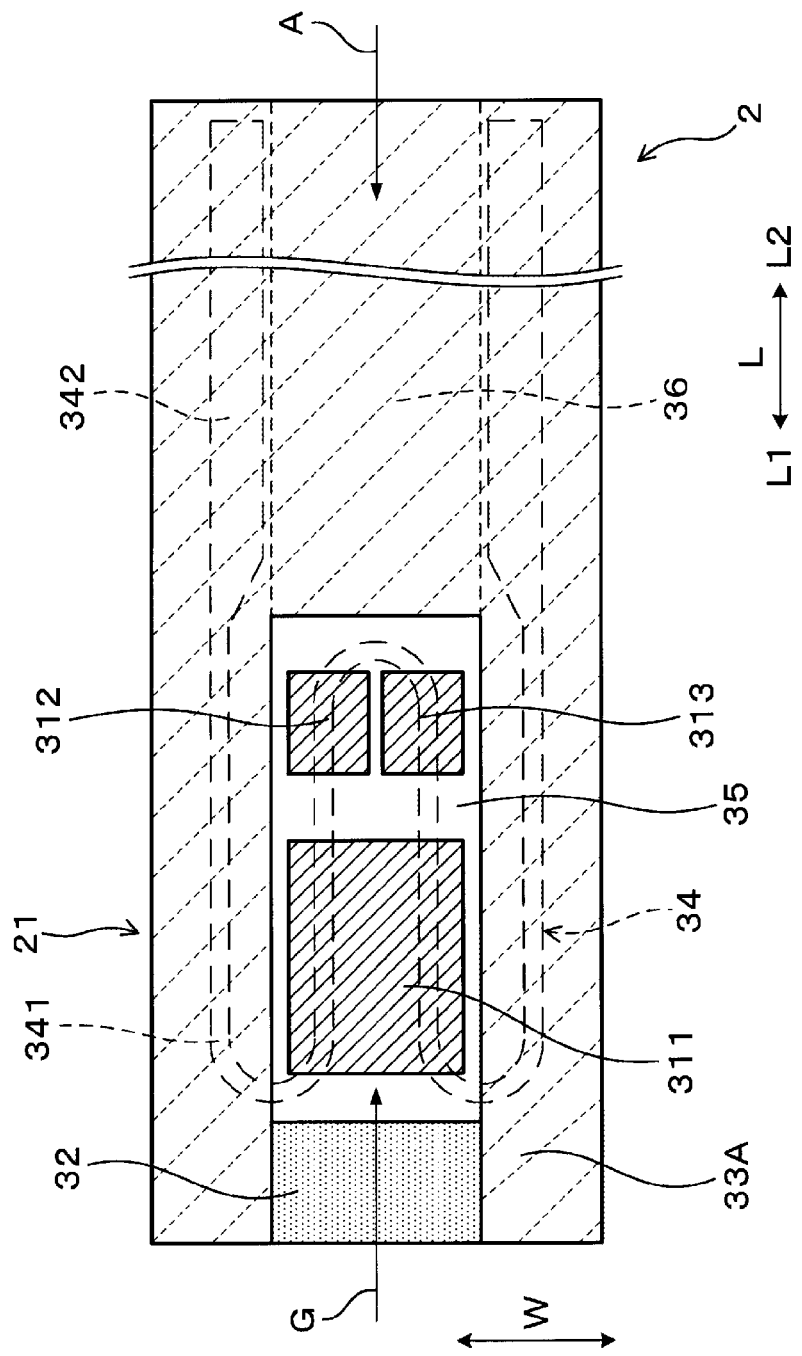
FIG. 4 is a cross-sectional view of the sensor element according to the first embodiment, taken along IV-IV in FIG. 2.

As shown in FIGS. 2 to 4, the sensor element 2 according to the present embodiment is formed in an elongated rectangular shape, and includes the solid electrolyte 31, the pump electrode 311, the sensor electrode 312, a monitor electrode 313, the reference electrode 314, a first insulating body 33A, a second insulating body 33B, a heat generating body 34, the gas chamber 35, and a reference gas duct 36. The sensor element 2 is a laminated type in which the solid electrolyte 31, the insulating bodies 33A and 33B, and the heat generating body 34 are laminated.

According to the present embodiment, a longitudinal direction L of the sensor element 2 refers to a direction in which the sensor element 2 extends in the elongated shape. In addition, a direction that is orthogonal to the longitudinal direction L and in which the solid electrolyte 31 and the insulating bodies 33A and 33B are laminated, or in other words, a direction in which the solid electrolyte 31, the insulating bodies 33A and 33B, and the heat generating body 34 are laminated is referred to as a lamination direction D.

Furthermore, a direction that is orthogonal to the longitudinal direction L and the lamination direction D is referred to as a width direction W. Moreover, in the longitudinal direction L of the sensor element 2, a side on which a detecting portion 21 that detects the $NO_X$ concentration and the like is formed is referred to as a tip end side L1 and a side opposite the tip end side L1 is referred to as a base end side L2.

(Solid Electrolyte 31)

As shown in FIGS. 2 and 3, the solid electrolyte 31 has conductivity to oxygen ions (O2-) at a predetermined activation temperature. The solid electrolyte 31 is composed of zirconia oxide. With zirconia as a main component (with a content of 50 mass % or greater), the solid electrolyte 31 is composed of stabilized zirconia or partially stabilized zirconia in which a portion of zirconia is substituted by a rare earth metal element or an alkaline earth metal element. A portion of the zirconia that composes the solid electrolyte 31 can be substituted by yttria, scandia, or calcia.

(Pump Electrode 311)

As shown in FIGS. 2 and 3, the pump electrode 311 is provided on the first surface 301 of the solid electrolyte 31 that comes into contact with the gas to be detected G, and is arranged in a section on the tip end side L1 inside the gas chamber 35. A pump cell 310A is formed by the pump electrode 311, a portion of the reference electrode 314, and a portion of the solid electrolyte 31 that is sandwiched between the pump electrode 311 and the portion of the reference electrode 314.

Between the pump electrode 311 and the reference electrode 314, a voltage applying circuit 61A that applies a direct-current voltage that indicates a limiting current characteristic between these electrodes 311 and 314 is connected. This direct-current voltage is applied such that a voltage at the reference electrode 314 is higher than a voltage at the pump electrode 311. In the pump cell 310A, oxygen in the gas to be detected G inside the gas chamber 35 becomes oxygen ions and moves from the pump electrode 311 to the reference electrode 314. The oxygen in the gas to be detected G inside the gas chamber 35 is thereby discharged.

The pump electrode 311 contains Pt (platinum) that serves as a noble metal that shows catalytic activity against oxygen, Au (gold) that serves as a noble metal that does not show catalytic activity against $NO_X$, and zirconia oxide that serves as a co-material with the solid electrolyte 31. For example, a content amount of Au in the overall pump electrode 311 can be within a range of 0.5 or more to 2 or less mass %. The co-material is provided to maintain bonding strength between the pump electrode 311 and the like that are composed of an electrode material and the solid electrolyte 31, when a paste-like electrode material is printed on (applied to) the solid electrolyte 31 and both are fired.

The pump electrode 311 may contain a Pt—Au alloy or may contain Pt and Au that are not alloyed. The pump electrode 311 can be that in which Pt particles, Au particles, and solid electrolyte particles are mixed and sintered. In addition, the pump electrode 33 can be that in which Pt—Au alloy particles and solid electrolyte particles are mixed and sintered.

(Sensor Electrode 312)

As shown in FIGS. 2 and 3, the sensor electrode 312 is provided on the first surface 301 of the solid electrolyte 31 that comes into contact with the gas to be detected G. The sensor electrode 312 is arranged inside the gas chamber 35, in a section that is further toward the base end side L2 than the arrangement section of the pump electrode 311. The sensor electrode 312 is arranged on a downstream side of a flow of the gas to be detected G that flows from a diffusion resistance portion 32 into the gas chamber 35.

A sensor cell 310B is formed by the sensor electrode 312, a portion of the reference electrode 314, and a portion of the solid electrolyte 31 that is sandwiched between the sensor electrode 312 and the portion of the reference electrode 314. Between the sensor electrode 312 and the reference electrode 314, a voltage applying circuit 61B that applies a direct-current voltage that indicates a limiting current characteristic between these electrodes 312 and 314 is connected. This direct-current voltage is applied such that the voltage at the reference electrode 314 is higher than the voltage at the sensor electrode 312.

In addition, between the sensor electrode 312 and the reference electrode 314, a current detecting circuit 62B for detecting a current that flows between these electrodes 312 and 314 is connected. The current detecting circuit 62B detects a sensor current that is generated between the sensor electrode 312 and the reference electrode 314 in a state in which the direct-current voltage is applied by the voltage applying circuit 61B. In the sensor cell 310B, $NO_X$ in the gas to be detected G that is in a state in which the oxygen concentration has decreased is decomposed, and oxygen that is produced after the decomposition becomes oxygen ions and migrates from the sensor electrode 312 to the reference electrode 314. Then, the sensor current based on a decomposition amount of $NO_X$ is detected by the current detecting circuit 62B.

The sensor electrode 312 contains Pt (platinum) that serves as a noble metal that shows catalytic activity against oxygen, Rh (rhodium) that serves as a noble metal that shows catalytic activity against $NO_X$, Au (gold) that serves as a noble metal that does not show catalytic activity against $NO_X$, and zirconia oxide that serves as a co-material with the solid electrolyte 31. The content amount of Au in the overall sensor electrode 312 can be less than the Au content in the overall pump electrode 311.

The sensor electrode 312 may contain a Pt—Rh—Au alloy or may contain Pt, Rh, and Au that are not alloyed. The sensor electrode 312 can be that in which Pt particles, Rh particles, Au particles, and solid electrolyte particles are mixed and sintered. In addition, the sensor electrode 312 may be that in which Pt—Rh—Au alloy particles and solid electrolyte particles are mixed and sintered.

(Composition of Sensor Element 312)

The sensor electrode 312 according to the present embodiment is an electrode for detecting $NO_X$. However, the sensor electrode 312 is that in which Au that is inert to $NO_X$ is deliberately contained to prevent the sensor current generated by the sensor cell 310B from changing when the sensor electrode 312 is used over a long period. In addition, it has become clear that, in the sensor electrode 312, not only a phenomenon in which Au that scatters from the pump electrode 311 attaches to the surface F, but also a phenomenon in which Au is deposited from inside the sensor electrode 312 toward the surface side occurs.

Furthermore, in the sensor electrode 312, a state in which Au is unevenly distributed on the surface F side is formed in advance in a state after manufacturing and before use of the sensor element 2. As shown in FIG. 5, in the sensor electrode 312, the area from the surface F of the sensor electrode 312 to a depth of 0.3 nm is prescribed as the surface layer Y, and the area located at depths ranging from 2 or more to 3 or less nm beneath the surface F of the sensor electrode 312 is prescribed as the reference layer X. In addition, with reference to the Au content in the reference layer X, the Au content in the surface layer Y is higher.

(Output Decrease Rate)

In the gas sensor 1 according to the present embodiment, an output decrease rate of the $NO_X$ concentration (sensor current) is used as a measure to indicate degradation that occurs in the sensor current generated by the sensor cell 310B, when attachment and deposition of Au on the surface F side of the sensor electrode 312 occur. This output decrease rate indicates a decrease rate (decrease proportion) of output of the $NO_X$ concentration (sensor current) after elapse of a predetermined amount of time from start of use of the gas sensor 1, in relation to that at the start of use of the gas sensor 1.

The output decrease rate [%] is affected by the Au content that is contained in the surface layer Y of the sensor electrode 312 at initial use of the gas sensor 1. The output decrease rate [%] tends to decrease as the Au content in the surface layer Y increases. In the gas sensor 1 according to the present embodiment, Au content $\alpha 1$ [mass %] in the surface layer Y relative to Au content $\alpha 0$ [mass %] in the reference layer X at initial use of the gas sensor 1 is used as Au content ratio $\alpha 1/\alpha 0$ [times].

Figure 6:
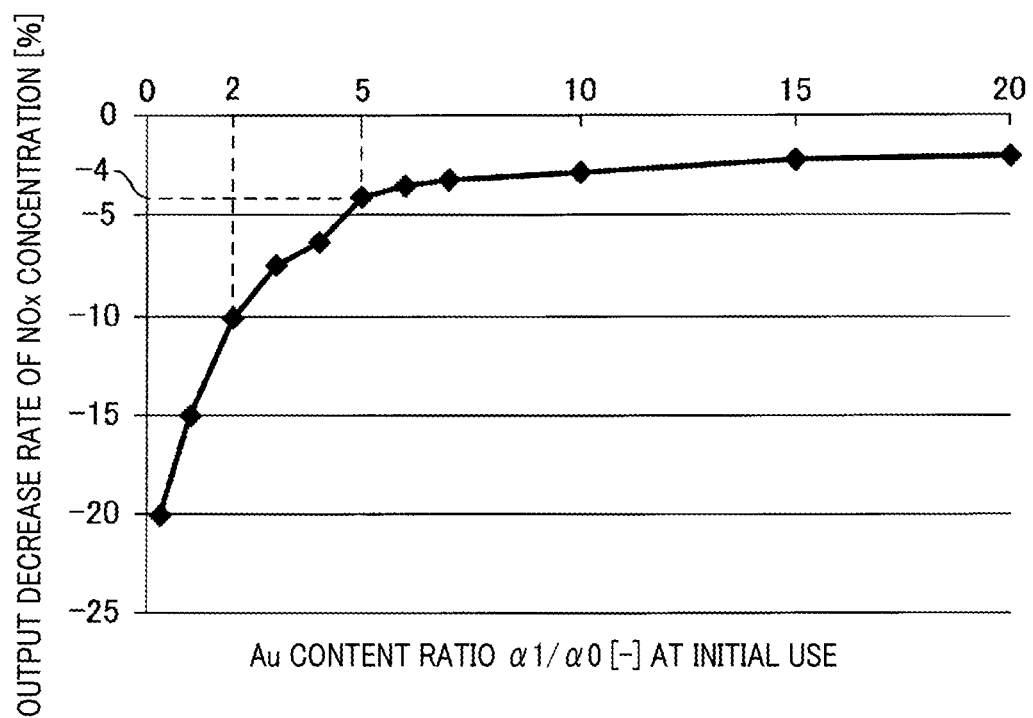
FIG. 6 is a graph of a relationship between Au content in the surface layer and the reference layer of the sensor electrode, and an output decrease rate of $NO_X$ concentration at initial use of the gas sensor according to the first embodiment.

In FIG. 6, a relationship between the Au content ratio $\alpha 1/\alpha 0$ at initial use of the gas sensor 1 and the output decrease rate after the gas sensor 1 is used over a predetermined amount of time is shown. A usage time of the gas sensor 1 when the output decrease rate is measured is set to when the vehicle in which the gas sensor 1 is mounted has traveled 300,000 km. In FIG. 6, it is clear that the output decrease rate significantly decreases as the Au content ratio $\alpha 1/\alpha 0$ decreases to be equal to or less than five times.

To keep the output decrease rate within 4%, the Au content ratio $\alpha 1/\alpha 0$ is preferably five times or greater. In this case, the output decrease rate of the $NO_X$ concentration upon endurable use that indicates the output decrease rate of the $NO_X$ concentration after the gas sensor 1 is used over a long period can be kept small. In addition, the Au content ratio $\alpha 1/\alpha 0$ can be two times or greater to keep the output decrease rate within 10%. In this case, the output decrease rate of the $NO_X$ concentration upon endurable use of the gas sensor 1 can be kept within an allowable range.

(Au Content and Au Content Ratio in the Sensor Element 312)

Furthermore, the Au content in the surface layer Y of the sensor electrode 312 is equal to or greater than 1 mass %. As a result of the surface layer Y containing 1 mass % or greater of Au, the output decrease rate of the $NO_X$ concentration upon endurable use of the gas sensor 1 can be suppressed. When the Au content in the surface layer Y is less than 1 mass %, the output decrease rate of the $NO_X$ concentration upon endurable use of the gas sensor 1 increases.

To more appropriately suppress the output decrease rate of the $NO_X$ concentration upon endurable use of the gas sensor 1, the Au content in the surface layer Y is preferably equal to or greater than 10 mass %. Meanwhile, when the Au content in the surface layer Y becomes too high, sensitivity of the sensor electrode 312 to $NO_X$ may decrease. Therefore, the Au content in the surface layer Y is preferably equal to or less than 25 mass %.

Figure 7:
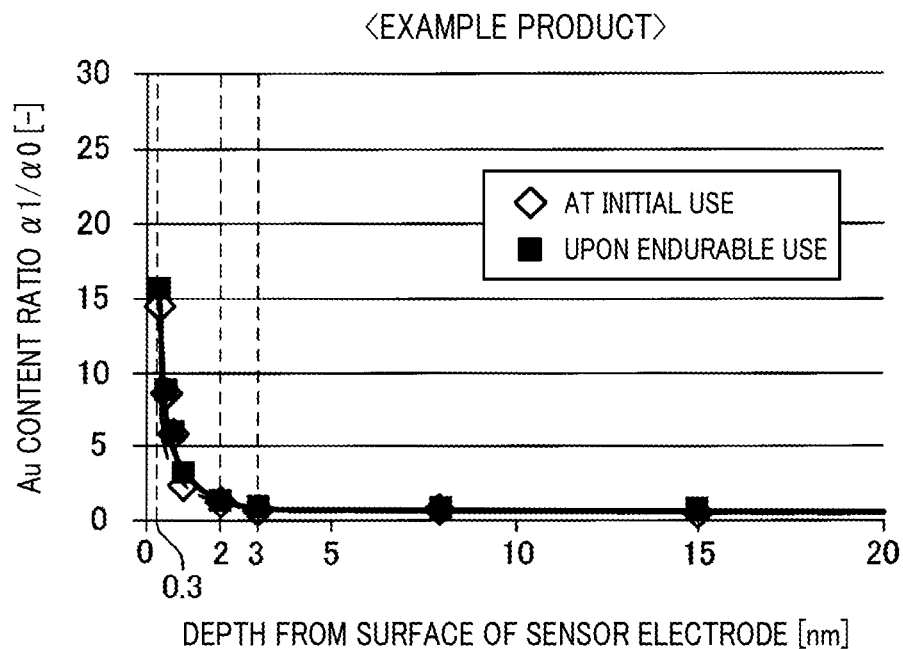
FIG. 7 is a graph of a relationship between depth from a surface of the sensor electrode, and the Au content in the surface layer and the reference layer of the sensor electrode of an example product according to the first embodiment.

In FIG. 7, a relationship between a depth from the surface (topmost surface) F of the sensor electrode 312 and the Au content in a depth position of the sensor electrode 312 in the sensor element 2 (example product) that has the sensor electrode 312 in which Au is unevenly deposited in the surface layer Y is shown. In FIG. 7, the Au content at initial use of the gas sensor 1 and the Au content upon endurable use (corresponding to traveling of 300,000 km by the vehicle) of the gas sensor 1 are shown.

In the sensor electrode 312 according to the present embodiment, at initial use of the gas sensor 1, the surface layer Y that is an area from the surface F of the sensor electrode 312 to a depth of 0.3 nm contains approximately 15 mass % Au. In this case, even upon endurable use of the gas sensor 1, the surface layer Y contains approximately 15 mass % Au. In addition, the reference layer X contains approximately 1 mass % Au both at initial use and upon endurable use of the gas sensor 1.

As is clear from the drawing, as a result of the sensor electrode 312 according to the present embodiment, it is clear that, from initial use to endurable use the gas sensor 1, changes in the Au content do not easily occur in both the surface layer Y and the reference layer X of the sensor electrode 312. Therefore, it can be said that the output of the $NO_X$ concentration from the gas sensor 1 hardly changes even after prolonged use.

Here, as shown in FIG. 6, the Au content can be an average value of values that are measured at a plurality of sections in a planar direction of the sensor electrode 312. For example, the Au content can be measured at two to ten measurement sections P in the planar direction of the sensor element 312 and be an average value thereof.

In the sensor element 2 according to the present embodiment, because a deposition process of Au is performed on the overall sensor electrode 312, a distribution state of Au formed in the lamination direction D of the sensor electrode 312 does not significantly differ among the sections in the planar direction of the sensor electrode 312. In addition, the Au content in the surface layer Y and the Au content ratio α1/α0 in the surface layer Y and the reference layer X do not significantly differ among the sections in the planar direction of the sensor electrode 312. Here, the planar direction refers to a direction that is orthogonal to the lamination direction D.

Therefore, a condition regarding the Au content in the surface layer Y of the sensor electrode 312 is considered to be met at all measurement sections P in the planar direction of the sensor electrode 312. The measurement section P for the Au content is prescribed as an area of a predetermined area in the planar direction of the sensor electrode 312. However, for example, a singularity in the composition of the sensor electrode 312, such as a portion in which the solid electrolyte is present in a clump, is excluded from the measurement section P.

For example, the Au content in the surface layer Y and the Au content in the reference layer Y of the sensor electrode 312 can be measured using X-ray photoelectron spectroscopy (XPS). In XPS, when X-rays are irradiated onto a surface of a sample, a distribution of kinetic energy of photoelectrons that are emitted from the surface is measured. In addition, a type, an amount present, a chemical bonding state, and the like of an element that is present in an area from the surface of the sample to a depth of approximately several nm are measured. For example, an ESCALAB200 manufactured by Thermo Fisher Scientific Inc. can be used in XPS.

As shown in FIG. 6, according to the present embodiment, the sensor electrode 312 is cut in the lamination direction D at an appropriate section, and the amounts present of Au that is present in the sections of the surface layer Y and the reference layer Y on the cut plane are measured. The surface F of the sensor electrode 312 is formed into an uneven shape as a result of the presence of the particles of Pt, Rh, Au, and the solid electrolyte, and is not formed in a flat shape. The depth from the surface F of the sensor electrode 312 for identifying the surface layer Y and the reference layer X is a depth from a tip of each measurement section P in the planar direction of the sensor electrode 312. Therefore, the tip of each measurement section P in the planar direction of the sensor electrode 312 differs accordingly.

Figure 8:
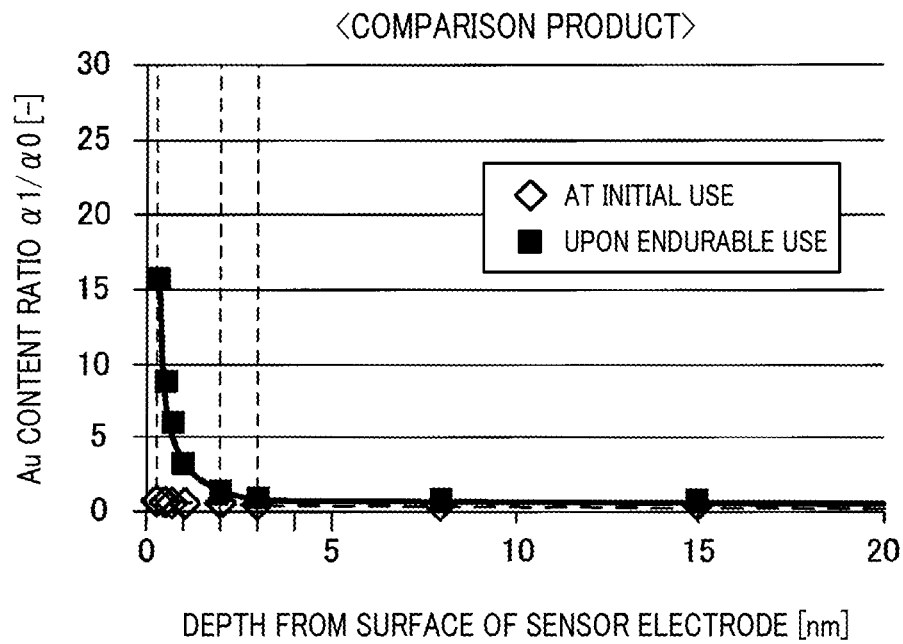
FIG. 8 is a graph of a relationship between depth from a surface of a sensor electrode, and Au content in a surface layer and a reference layer of a sensor electrode of a comparison product according to the first embodiment.

In FIG. 8, for comparison, a relationship between the depth from the surface (topmost surface) F of the sensor electrode 312 and the Au content at the depth position of the sensor electrode 312 when Au is not unevenly deposited in the surface layer Y of the sensor electrode 312 and Au is dispersed over the overall sensor electrode 312 (comparison product) is shown. In this drawing as well, the Au content at initial use of the gas sensor 1 and the Au content upon endurable use the gas sensor 1 (corresponding to traveling of 300,000 km by the vehicle) are shown.

In the sensor electrode 312 of the comparison product, at initial use of the gas senor 1, Au of approximately 0.2 mass % is contained near a surface side that includes the surface layer Y and the reference layer X. In this case, it is clear that, upon endurable use of the gas sensor 1, attachment, deposition, and the like of Au on the surface layer Y has occurred, and the Au content in the surface layer Y has changed to approximately 15 mass %. In addition, as a result of this change in the Au content in the surface layer Y, output of the $NO_X$ concentration tends to decrease when the usage period of the gas sensor 1 increases.

Through comparison between the sample product and the comparison product at initial use and upon endurable use, shown in FIGS. 7 and 8, effects of unevenly distributing Au in the surface layer Y of the sensor electrode 312 in advance can be confirmed.

(Monitor Electrode 313)

As shown in FIGS. 2 and 3, the monitor electrode 313 is provided on the first surface 301 of the solid electrolyte 31 that comes into contact with the gas to be detected G. The monitor electrode 313 is arranged inside the gas chamber 35, in a section that is adjacent to the sensor electrode 312 from the width direction W, of a section that is further toward the base end side L2 than the arrangement section of the pump electrode 311. The monitor electrode 313 is arranged on the downstream side of the flow of the gas to be detected G that flows into the gas chamber 35 from the diffusion resistance portion 32, in relation to the pump electrode 311.

A monitor cell 310C is formed by the monitor electrode 313, a portion of the reference electrode 314, and a portion of the solid electrolyte 31 that is sandwiched between the monitor electrode 313 and the portion of the reference electrode 314. Between the monitor electrode 313 and the reference electrode 314, a voltage applying circuit 61C that applies a direct-current voltage that indicates a limiting current characteristic between these electrodes 313 and 314 is connected. This direct-current voltage is applied such that the voltage at the reference electrode 314 is higher than the voltage at the monitor electrode 313.

In addition, between the monitor electrode 313 and the reference electrode 314, a current detecting circuit 62C for detecting a current that flows between these electrodes 313 and 314 is connected. The current detecting circuit 62C detects a current that is generated between the monitor electrode 313 and the reference electrode 314 in a state in which the direct-current voltage is applied by the voltage applying circuit 61C. In the monitor cell 310C, residual oxygen in the gas to be detected G inside the gas chamber 35 in a state in which the oxygen concentration has decreased becomes oxygen ions and moves from the monitor electrode 313 to the reference electrode 314. Then, a monitor current based on a decomposition amount of the residual oxygen is detected by the current detection circuit 62C.

The monitor electrode 313 contains Pt (platinum) that serves as a noble metal that shows catalytic activity against oxygen, Au (gold) that serves as a noble metal that shows catalytic activity against $NO_X$, and zirconia oxide that serves as a co-material with the solid electrolyte 31.

The monitor electrode 313 may contain a Pt—Au alloy or may contain Pt and Au that are not alloyed. The monitor electrode 313 can be that in which Pt particles, Au particles, and solid electrolyte particles are mixed and sintered. In addition, the monitor electrode 313 can also be that in which Pt—Au alloy particles and solid electrolyte particles are mixed and sintered.

(Reference Electrode 314)

As shown in FIGS. 2 and 3, the reference electrode 314 is provided on the second surface 302 of the solid electrolyte 31 that comes into contact with a reference gas A and is arranged in a section inside the reference gas duct 36 on the tip end side L1. Regarding the reference electrode 314 according to the present embodiment, a single reference electrode 314 is formed so as to be shared in a position opposing the pump electrode 311, the sensor electrode 312, and the monitor electrode 313 in the lamination direction D of the sensor element 2 with the solid electrolyte 31 therebetween.

Here, for example, the reference electrode 314 may be individually formed in positions that respectively oppose the pump electrode 311, the sensor electrode 312, and the monitor electrode 313 in the lamination direction D of the sensor element 2 with the solid electrolyte 31 therebetween.

The reference electrode 314 contains Pt (platinum) that serves as a noble metal that shows catalytic activity against oxygen, and zirconia oxide that serves as a co-material with the solid electrolyte 31. The reference electrode 314 can be that in which Pt particles and solid electrolyte particles are mixed and sintered.

($NO_X$ Detecting Portion 63)

As shown in FIG. 3, the gas sensor 1 includes a $NO_X$ detecting portion 63 that determines the $NO_X$ concentration based on a current difference value obtained by the monitor current in the monitor cell 310C being subtracted from the sensor current in the sensor cell 310B. The sensor current in the sensor cell 310B also includes a current that is generated by the residual oxygen, in addition to a current that is generated by $NO_X$.

Therefore, through use of the monitor cell 310C, the $NO_X$ detecting portion 63 cancels an effect of the current generated by the residual oxygen on the sensor current. Through use of the monitor electrode 313 and the monitor cell 310C, the effect that oxygen that remains inside the gas chamber 35 after the oxygen concentration is adjusted by the pump electrode 311 has on the detection of $NO_X$ can be reduced.

In the $NO_X$ detecting portion 63, a relationship between the current difference value and the $NO_X$ concentration is prescribed as a relational expression. The $NO_X$ detecting portion 63 collates the current difference value with the relational expression and determines the $NO_X$ concentration in the gas to be detected G.

Here, when there is little residual oxygen inside the gas chamber 35 after oxygen is discharged by the pump cell 310A, the monitor electrode 313 and the monitor cell 310C may not be used. In this case, the $NO_X$ concentration is determined based on the sensor current in the sensor cell 310B.

(Oxygen Detecting Portion)

As shown in FIG. 2, between the pump electrode 311 and the reference electrode 314, a current detecting circuit 62A for detecting an oxygen current that flows between these electrodes 311 and 314 when the direct-current voltage is applied by the voltage applying circuit 61A may be connected. In this case, an oxygen detecting portion is configured in the gas sensor 1, and the oxygen detecting portion can determine the oxygen concentration of the gas to be detected G or the air-fuel ratio (A/F) based on the oxygen current.

An electrode lead portion 315 for electrically connecting the pump electrode 311, the sensor electrode 312, the monitor electrode 313, and the reference electrode 314 to outside the gas sensor 1 is connected to these electrodes 311, 312, 313, and 314. The electrode lead portion 315 is drawn out to a section on the base end side L2 in the longitudinal direction L of the sensor element 2.

(Gas Chamber 35)

As shown in FIGS. 2 to 4, on the first surface 301 of the solid electrolyte 31, the gas chamber 35 that is surrounded by the first insulating body 33A and the solid electrolyte 31 is formed so as to be adjacent thereto. The gas chamber 35 is formed in a position in the first insulating body 33A in which the pump electrode 311, the sensor electrode 312, and the monitor electrode 313 are housed. The gas chamber 35 is formed as a space portion that is closed by the first insulating body 33A, the diffusion resistance portion 32, and the solid electrolyte 31. The gas to be detected G that is the exhaust gas that flows through the exhaust pipe 7 passes through the diffusion resistance portion 32 and is introduced into the gas chamber 35.

(Diffusion Resistance Portion 32)

The diffusion resistance portion 32 according to the present embodiment is formed so as to be adjacent to the tip end side L1 in the longitudinal direction L of the gas chamber 35. The diffusion resistance portion 32 is arranged in the first insulating body 33A, inside an inlet that is open so as to be adjacent to the tip end side L1 in the longitudinal direction L of the gas chamber 35. The diffusion resistance portion 32 is formed by a porous metal oxide such as alumina. A diffusion speed (flow rate) of the gas to be detected G that is introduced into the gas chamber 35 is determined by a speed at which the gas to be detected G passes through pores in the diffusion resistance portion 32 being restricted.

The diffusion resistance portion 32 may be formed so as to be adjacent on both sides in the width direction W of the gas chamber 35. In this case, the diffusion resistance portions 32 are arranged in the first insulating body 33A, inside inlets that are open so as to be adjacent to both sides in the width direction W of the gas chamber 35. Here, in addition to the diffusion resistance portion 32 being formed using a porous metal oxide, the diffusion resistance portion 32 can also be formed using a pin hole that is a small through-hole connected to the gas chamber 35.

(Reference Gas Duct 36)

As shown in FIGS. 2 and 3, the reference gas duct 36 that is surrounded by the second insulating body 33B and the solid electrolyte 31 is formed the second surface 302 of the solid electrolyte 31 so as to be adjacent thereto. The reference gas duct 36 is formed in the second insulating body 33B, from a position in which the reference electrode 314 is housed to a rear end position of the sensor element 2. A rear end opening portion 361 of the reference gas duct 36 is formed in the rear end position in the longitudinal direction L of the sensor element 2. The reference gas duct 36 is formed from the rear end opening portion 361 to a position that opposes the gas chamber 35 with the solid electrolyte 31 therebetween. The reference gas A such as atmospheric air is introduced into the reference gas duct 36 from the rear end opening portion 361.

(Heat Generating Body 34)

As shown in FIGS. 2 to 4, the heat generating body 34 is provided so as to be embedded in the second insulating body 33B that forms the reference gas duct 36, and includes a heat generating portion 341 that generates heat by energization and a heat generating body lead portion 342 that is connected to the heat generating portion 341. The heat generating portion 341 is arranged in a position in which at least a portion overlaps the pump electrode 311, the sensor electrode 312, the monitor electrode 313, and the reference electrode 314 in the lamination direction D of the solid electrolyte 31 and the insulating bodies 33A and 33B. Here, the heat generating body 34 may be provided so as to be embedded in the first insulating body 33A that forms the gas chamber 35.

In addition, the heat generating body 34 includes the heat generating portion 341 that generates heat by energization and the pair of heat generating body lead portions 342 that is connected to the base end side L1 in the longitudinal direction L of the heat generating portion 341. The heat generating portion 341 is formed by a linear conductor portion that meanders by a straight portion and a curved portion. The straight portion of the heat generating portion 341 according to the present embodiment is formed parallel to the longitudinal direction L. The heat generating body lead portion 342 is formed by the straight conductor portion. A resistance value per unit length of the heat generating portion 341 is greater than a resistance value per unit length of the heat generating body lead portion 342. The heat generating body lead portion 342 is drawn out to a section on the base end side L2 in the longitudinal direction L. The heat generating body 34 contains a metal material that has conductivity.

The heat generating portion 341 according to the present embodiment is formed into a shape that meanders in the longitudinal direction L in a position on the tip end side L1 in the longitudinal direction L of the heat generating body 34. Here, the heat generating portion 341 may be formed so as to meander in the width direction W. As a result of the heat generating portion 341 generating heat by energization from the heat generating body lead portion 342, sections of the pump electrode 311, the sensor electrode 312, the monitor electrode 313, the reference electrode, and the solid electrolyte 31 that are sandwiched between the electrodes 311, 312, 313, and 314 are heated to a target temperature.

A cross-sectional area of the heat generating portion 341 is smaller than the cross-sectional area of the heat generating body lead portion 342. The resistance value per unit length of the heat generating portion 341 is higher than the resistance value per unit length of the heat generating body lead portion 342. This cross-sectional area refers to a cross-sectional area of a plane that is orthogonal to a direction in which the heat generating portion 341 and the heat generating body lead portion 342 extend.

In addition, when a voltage is applied to the pair of heat generating body lead portions 342, the heat generating portion 341 generates heat by Joule heat. As a result of this heat generation, the vicinity of the detecting portion 21 of the sensor element 2 is heated. An energizing circuit for performing energization of the heat generating portion 341 through the pair of heat generating body lead portions 342 is connected to the heat generating body 34.

(Insulating Bodies 33A and 33B)

As shown in FIGS. 2 to 4, the insulating bodies 33A and 33B are the first insulating body 33A and the second insulating body 33B. The first insulating body 33A is laminated on the first surface 301 in the lamination direction D of the solid electrolyte 31 and forms the gas chamber 35. The second insulating body 33B is laminated on the second surface 302 in the lamination direction D of the solid electrolyte 31 and, in addition to forming the reference gas duct 36, embeds the heat generating body 34. The gas chamber 35 is formed in a groove-like shape in a section of the first insulating body 33A that is adjacent to the first surface 301 of the solid electrolyte 31. The reference gas duct 36 is formed in a groove-like shape in a section of the second insulating body 33B that is adjacent to the second surface 302 of the solid electrolyte 31. The insulating bodies 33A and 33B are configured by an insulating material such as alumina (aluminum dioxide).

(Porous Layer 37)

As shown in FIG. 1, a porous layer 37 for capturing substances that are toxic to the sensor electrode 312, condensate that is produced inside the exhaust pipe 7, and the like is provided over an overall periphery of the section on the tip end side L1 in the longitudinal direction L of the sensor element 2, so as to cover the detecting portion 21. The porous layer 37 is formed by a porous ceramic (metal oxide) such as alumina. A porosity of the porous layer 37 is greater than a porosity of the diffusion resistance portion 32, and a flow amount of the gas to be detected G that can pass through the porous layer 37 is greater than a flow amount of the gas to be detected G that can pass through the diffusion resistance portion 32.

(Detecting Portion 21)

The detecting portion 21 for detecting $NO_X$ is formed by the gas chamber 35, the diffusion resistance portion 32, the pump electrode 311, the sensor electrode 312, the monitor electrode 313, and the reference electrode 314, in the section on the tip end side L1 in the longitudinal direction L of the sensor element 2.

(Other Configurations of the Gas Sensor 1)

As shown in FIG. 1, the gas sensor 1 includes, in addition to the sensor element 2, a first insulator 42 that holds the sensor element 2, a housing 41 that holds the first insulator 42, a second insulator 43 that is connected to the first insulator 42, and a connection terminal 44 that is held by the second insulator 43 and in contact with the sensor element 2. In addition, the gas senor 1 includes a tip-end-side cover 45 that is mounted in a section on the tip end side L1 of the housing 41 and covers a section of the tip end side L1 of the senor element 2, a base end side cover 46 that is mounted in a section on the base end side L2 of the housing 41 and covers the second insulator 43, the connection terminal 44, and the like, a bush 47 for holding a lead wire 48 that is connected to the connection terminal 44 to the base end side cover 46, and the like.

The section on the tip end side L1 of the sensor element 2 and the tip-end-side cover 45 are arranged inside the exhaust pipe 7 of the internal combustion engine. A gas passage hole 451 for allowing exhaust gas that serves as the gas to be detected G to pass is formed in the tip-end-side cover 45. The tip-end-side cover 45 can be that which has a double-layer structure or that which has a single-layer structure. The exhaust gas that serves as the gas to be detected G that flows from the gas passage hole 451 of the tip end side cover 45 into the tip-end-side cover 45 passes through the porous layer 37 and the diffusion resistance portion 32 of the sensor element 2, and is led to the pump electrode 331, the sensor electrode 312, and the monitor electrode 313 inside the gas chamber 35.

The base end side cover 46 is arranged outside the exhaust pipe 7 of the internal combustion engine. In the base end side cover 46, an atmospheric-air introduction hole 461 for introducing the reference gas A into the base end side cover 46 is formed. A filter 462 that does not allow liquid to pass but allows gas to pass is arranged in the atmospheric-air introduction hole 461. The reference gas A that is introduced into the base end side cover 46 from the atmospheric-air introduction hole 461 passes through a space inside the base end side cover 46 and the reference gas duct 36, and is led to the reference electrode 314.

A plurality of connection terminals 44 are arranged in the second insulator 43 so as to be respectively connected to the electrode lead portions 315 of the pump electrode 311, the sensor electrode 312, the monitor electrode 313, and the reference electrode 314, and the heat generating body lead portion 342 of the heat generating body 34. In addition, the lead wire 48 is connected to each of the connection terminals 44.

(Sensor Control Unit 6)

As shown in FIGS. 1 to 3, the lead wire 48 in the gas sensor 1 is electrically connected to a sensor control unit (SCU) 6 that performs control of gas detection in the gas sensor 1. The sensor control unit 6 performs electrical control in the gas sensor 1 in cooperation with an engine control unit (ECU) that controls combustion driving in the engine.

The voltage applying circuits 61A, 61B, and 61C in the pump cell 310A, the sensor cell 310B, and the monitor cell 310C, the current detecting circuits 62B and 62C in the sensor cell 310B and the monitor cell 310C, the $NO_X$ detecting portion 63, the energizing circuit of the heat generating body 34, and the like are constructed in the sensor control unit 6. Here, the sensor control unit 6 may be constructed inside the engine control unit. Temperatures of the pump electrode 311, the sensor electrode 312, the monitor electrode 313, and the reference electrode 314, and the sections of the solid electrolyte 31 that are sandwiched between the electrodes 311, 312, 313, and 314 are controlled to a predetermined activation temperature by an energization amount supplied to the heat generating body 34.

(Correction of the $NO_X$ Concentration)

In the gas sensor 1 according to the present embodiment, Au is intentionally deposited in the surface layer Y of the sensor electrode 312 of the sensor element 2. Therefore, as a result of the sensor electrode 312 containing Au and Au being deposited in the surface layer Y, compared to when the sensor electrode 312 does not contain Au, sensitivity of the sensor electrode 312 to $NO_X$ decreases. Therefore, in the $NO_X$ detecting portion 63 of the sensor control unit 6, as a result of the sensor electrode 312 containing Au and Au being deposited in the surface layer Y, the configuration is such that $NO_X$ concentration can be determined taking into consideration a decrease amount of the sensor current that decreases compared to when the sensor electrode 312 does not contain Au.

More specifically, in a relational expression between the sensor current and the $NO_X$ concentration, a correction coefficient for correcting the decrease amount of the sensor current at initial use of the gas sensor 1 is set. Then, in the gas sensor 1 according to the present embodiment, the $NO_X$ concentration is determined taking into consideration the decrease amount of the sensor current at initial use of the gas sensor 1. The decrease amount of the sensor current does not easily change during use of the gas sensor 1 as a result of the senor electrode 312 in which deposition of Au does not easily occur during use of the gas sensor 1 being used in the senor element 2. As a result, the gas sensor 1 in which changes in the output of the $NO_X$ concentration does not easily occur even when the usage period of the gas sensor 1 becomes long can be formed.

(Manufacturing Method of the Sensor Element 2 of the Gas Sensor 1)

Figure 9:
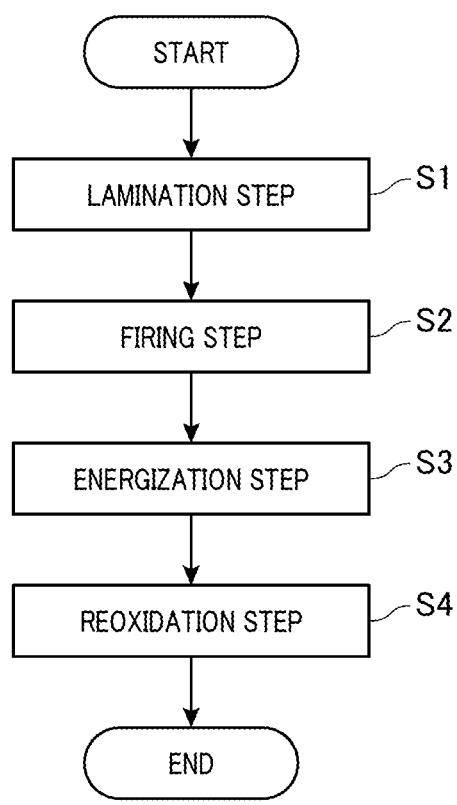
FIG. 9 is a flowchart of a manufacturing method of the sensor element according to the first embodiment.

As shown in FIG. 9, the sensor element 2 of the gas senor 1 according to the present embodiment is manufactured by a lamination step S1, a firing step S2, an energization step S3, and a reoxidation step S4 being performed. At the lamination step S1, a sheet that composes the solid electrolyte 31, sheets that compose the insulating bodies 33A and 33B, and the like are laminated and adhered by adhesive layers. At this time, paste materials that compose the electrodes 311, 312, 313, and 314 are printed on (applied to) the sheet that composes the solid electrolyte 31, and a paste material that composes the heat generating body 34 is printed on (applied to) the sheet that composes the second insulating body 33B.

More specifically, at the lamination step S1, a paste material for the pump electrode 311 that contains Pt, Au, and the solid electrolyte, a paste material for the sensor electrode 312 that contains Pt, Rh, Au, and the solid electrolyte, a paste material for the monitor electrode 313 that contains Pt, Au, and the solid electrolyte, and a paste material for the reference electrode 314 that contains Pt and the solid electrolyte are printed on the sheet that composes the solid electrolyte 31. Then, an intermediate body of the sensor element 2 in which the sheet that composes the solid electrolyte 31 and the sheets that compose the insulating bodies 33A and 33B are laminated is formed.

Next, at the firing step S2, the intermediate body of the sensor element 2 is heated to a temperature within a range of 1400° C. or more to 1500° C. or less in a heating furnace and fired. At this time, atmospheric gas inside the heating furnace in which the intermediate body is arranged is an inert gas that has an oxygen concentration of 1 volume %. For example, the inert gas can have a composition that contains 0.3 or more to 2 or less volume % oxygen and of which a remaining portion is nitrogen. In addition, at the firing step S2, the intermediate body is held inside the heating furnace for a predetermined amount of time.

At the firing step S2, when the intermediate body is fired, Au scattering from the paste material of the pump electrode 311 inside the gas chamber 35 as a result of the heat inside the heating furnace can be considered. However, according to the present embodiment, because the oxygen concentration of the atmospheric gas inside the heating furnace is restricted so as to be low, the amount of Au scattered from the pump electrode 311 can be restricted so as to be small.

Next, at the energization step S3, the sensor element 2 after firing is heated to a temperature within a range of 900° C. or more to 1100° C. or less. In addition, a direct-current voltage is respectively applied between the pump electrode 311 and the reference electrode 314, between the sensor electrode 312 and the reference electrode 314, and between the monitor electrode 313 and the reference electrode 314, and energization among the electrodes 311, 312, 313, and 314 is performed. The direct-current voltage is applied such that the voltage at the reference electrode 314 is lower than the voltages at the pump electrode 311, the sensor electrode 312, and the monitor electrode 313.

In addition, an absolute value of a potential difference of the direct-current voltages can be made greater than the voltages that are applied between the electrodes 311, 312, 313, and 314 by the voltage applying circuits 61A, 61B, and 61C during use of the gas sensor 1. In addition, heating of the sensor element 2 can be performed by the sensor element 2 being arranged inside the heating furnace or by the heat generating body 34 of the sensor element 2 being energized.

Furthermore, at the energization step S3, nitrogen is introduced into the gas chamber 35 of the sensor element 2, and atmospheric air is introduced inside the reference gas duct 36 of the sensor element 2. As a result of the direct-current voltage being applied between the electrodes 311, 312, 313, and 314, oxygen ions are conducted (moved) from the reference electrode 314 to the pump electrode 311, the sensor electrode 312, and the monitor electrode 313, through the solid electrolyte 31.

In addition, as a result of the direct-current voltage being applied between the electrodes 311, 312, 313, and 314, air holes that serve as numerous three-phase interfaces for enabling the noble metals, the solid electrolyte, and oxygen to come into contact with one another are formed in the electrodes 311, 312, 313, and 314. At the energization step S3, as a result of the inside of the gas chamber 35 being a nitrogen atmosphere, scattering of Au from the surface of the pump electrode 311 is suppressed.

Next, at the reoxidation step S4, the solid electrolyte 31 of the sensor element 2 is replenished with oxygen. At this time, the sensor element 2 is heated to a temperature within a range of 800° C. or more to 1100° C. ore less. In other words, the reoxidation step S4 stops the process of energization to the electrodes 311, 312, 313, and 314, slightly reduces the temperature to which the sensor element 2 is heated, and maintains the state in which the sensor element 2 is heated. Heating of the sensor element 2 can be performed by the sensor element 2 being arranged inside the heating furnace or by the heat generating body 34 of the sensor element 2 being energized.

In addition, at the reoxidation step S4, an inert gas with an oxygen concentration of 1 volume % or less is introduced into the gas chamber 35 of the sensor element 2, and atmospheric air is introduced into the reference gas duct 36 of the sensor element 2. In addition, based on a difference between the oxygen concentration of atmospheric air that is in contact with the reference electrode 314 and the oxygen concentration of the inert gas that is in contact with the pump electrode 311, the sensor electrode 312, and the monitor electrode 313, oxygen ions are conducted (moved) from the reference electrode 314 to the pump electrode 311, the sensor electrode 312, and the monitor electrode 313 through the solid electrolyte 31. As a result, even when oxygen is taken from the solid electrolyte 31 when energization is performed among the electrodes 311, 312, 313, and 314 at the energization step S3, the solid electrolyte 31 can be newly replenished with oxygen.

Furthermore, at the reoxidation step S4, as a result of the oxygen concentration of the inert gas that is introduced into the gas chamber 35 being equal to or less than 1 volume % at a temperature within a range of 800° C. or more to 1100° C. or less, Au is more easily segregated (deposited) from inside the sensor electrode 312 in the gas chamber 35 toward the surface F side. As a result of processing being performed in a low-oxygen atmosphere, Au has a characteristic in that Au is more easily deposited on the surface than Pt or Rh. Through use of this characteristic, Au that is present near the surface F side of the sensor element 312 in particular is further deposited to the surface layer Y on the surface F side.

A lower oxygen concentration in the inert gas is more preferable. However, in actually, due to limitations of apparatuses and the like, the oxygen concentration of the inert gas can be equal to or greater than 0.1 volume %. In addition, when the oxygen concentration of the inert gas exceeds 1 volume %, the solid electrolyte 31 may not easily be replenished with oxygen.

After the reoxidation step S4 is performed, the surface layer Y of the sensor electrode 312 of which the Au content is within a range of 10 or more to 25 or less mass % is formed. The reference layer X of which the Au content is within a range of 1 or more to 5 or less mass % is formed. In addition, the Au content in the surface layer Y is set to be 2 or more to 25 or less times the Au content in the reference layer X. In this manner, the sensor element 2 in which Au is deposited on the surface F of the sensor electrode 312 is manufactured.

When the reoxidation step S4 is performed, Au that is contained in the pump electrode 311 may be scattered and attach to the sensor electrode 312. In addition, Au in the surface layer Y of the sensor electrode 312 may include Au that is deposited from inside the sensor electrode 312, and Au that scatters from the pump electrode 311 and attaches to the surface layer Y.

Moreover, when the energization step S3 is performed, Au may be deposited from inside the sensor electrode 312 toward the surface side. Au in the surface layer Y of the sensor electrode 312 may include the Au that scatters from the pump electrode 311 and attaches to the surface layer Y when the energization step S3 is performed.

Deposition of Au from inside the sensor electrode 312 toward the surface side is performed by the heat that is applied to the sensor electrode 312. Therefore, deposition of Au from inside the sensor electrode 312 toward the surface side is thought to be gradually performed over the overall firing step S2, energization step S3, and reoxidation step S4. According to the present embodiment, a state in which Au is easily deposited from inside the sensor element 312 toward the surface side at the reoxidation step S4 is particularly formed.

In addition, when the reoxidation step S4 is performed, Au is deposited from inside the sensor electrode 312 toward the surface side. Furthermore, Au is also deposited from inside toward the surface side in the pump electrode 311 and the monitor electrode 313 as well. The pump electrode 311 and the monitor electrode 313 are merely required to be inert to $NO_X$, and adverse effects due to Au being deposited on the surface side hardly occur.

An output of the monitor electrode 313 is used to determine a difference with the output of the sensor electrode 312. Therefore, the monitor electrode 313 may hardly contain Au.

In addition, as a method for increasing the Au content in the surface layer Y of the sensor electrode 312 to be higher than the Au content in the reference layer X of the sensor electrode 312, for example, as a chemical vapor deposition method, a method in which Au is deposited on the surface of the electrode sections containing Pt and Rh may be used.

In addition, in the reoxidation step S4, instead of the inert gas that has an oxygen concentration equal to or less than 1 volume % being introduced into the gas chamber 35, an inert gas that contains hydrogen, such as an inert gas that has a hydrogen concentration of 0.1 or more to 5 or less volume % can be introduced. In this case, it is thought that oxygen ions are more easily conducted (moved) from the reference electrode 314 to the sensor electrode 312 through the solid electrolyte 31 to react with hydrogen that is present in the vicinity of the sensor electrode 312, and the solid electrolyte 31 can be more effectively replenished with oxygen.

(Surface Energy)

It is thought that deposition of Au from the inside of the sensor electrode 312 of the sensor element 2 toward the surface side is based on a surface energy of Au being less than that of Pt and Rh contained in the sensor electrode 312. A surface energy $\gamma$ [J/cm$^2$] of a substance is generally expressed as a theoretical formula (Gilman equation) by $\gamma = E/y0 \, (a0/\pi)^2$. Here, E [N/cm$^2$] denotes Young's modulus, y0 [Å] denotes lattice spacing, and a0 [Å] denotes a distance of intermolecular attraction force.

Whereas the surface energies $\gamma$ of Pt and Rh are approximately 2.4 to 2.5 [J/cm$^2$], the surface energy $\gamma$ of Au of is approximately 1.5 [J/cm²]. In addition, as a result of the surface energy of Au being less than the surface energies of Pt and Rh, Au is more easily drawn to the surface F of the sensor electrode 312 by heat than Pt and Rh. Moreover, Au can be deposited to the surface layer Y of the sensor electrode 312.

(Working Effects)

In the gas sensor 1 according to the present embodiment, through use of the sensor element 2 in which the pump electrode 311 and the sensor electrode 312 contain Au, a special modification is made to a distribution state of Au in the sensor electrode 312. Specifically, the Au content in the surface layer Y of the sensor electrode 312 is within a range of 10 or more to 25 or less mass % and is higher than the Au content in the reference layer X of the sensor electrode 312. In addition, the Au content in the surface layer Y is five times the Au content in the reference layer X or more.

The surface layer Y indicates a layer that configures an area from the surface F of the sensor electrode 312 to a depth of 0.3 nm. When the Au content in the sensor electrode 312 is measured, the surface layer Y is an area of depth from the topmost surface at the measurement section P. In addition, the reference layer X indicates a layer that configures an area that serves as reference to indicate that the Au content in the surface layer Y is higher than the Au content in a position deeper than the surface layer Y. The reference layer X is a layer that configures an area located at depths ranging from 2 or more to 3 or less nm beneath the surface F of the sensor electrode 312.

The measurement section P when the Au content in the surface layer Y and the Au content in the reference layer X are measured is set in a plurality of locations, such as three to ten locations in the planar direction of the sensor electrode 312. In addition, conditions regarding the Au content in the surface layer Y and the Au content ratio $\alpha 1/\alpha 0$ are met in the measurement sections P in the plurality of locations. Furthermore, the conditions regarding the Au content in the surface layer Y and the Au content ratio $\alpha 1/\alpha 0$ may be met by an average value of the measurement sections P in the plurality of locations.

As a result of the surface layer Y of the sensor electrode 312 containing Au that is within a range of 10 or more to 25 or less mass %, and Au being unevenly distributed in large amounts in the surface layer Y of the sensor electrode 312 in advance, Au does not easily move from inside the sensor electrode 312 toward the surface side during use of the gas sensor 1. Consequently, sensitivity of the sensor electrode 312 to $NO_X$ can be made less prone to deteriorating from the initial use of the gas sensor 1 to after a predetermined period of use.

Therefore, as a result of the gas sensor 1 according to the present embodiment, detection accuracy regarding the $NO_X$ concentration using the sensor electrode 312 can be made less prone to deteriorating. In addition, as a result of the manufacturing method of the gas sensor 1 according to the present embodiment, the gas sensor 1 in which detection accuracy regarding a specific gas component using the sensor electrode 312 can be made less prone to deteriorating can be manufactured.

Second Embodiment

Figure 10:
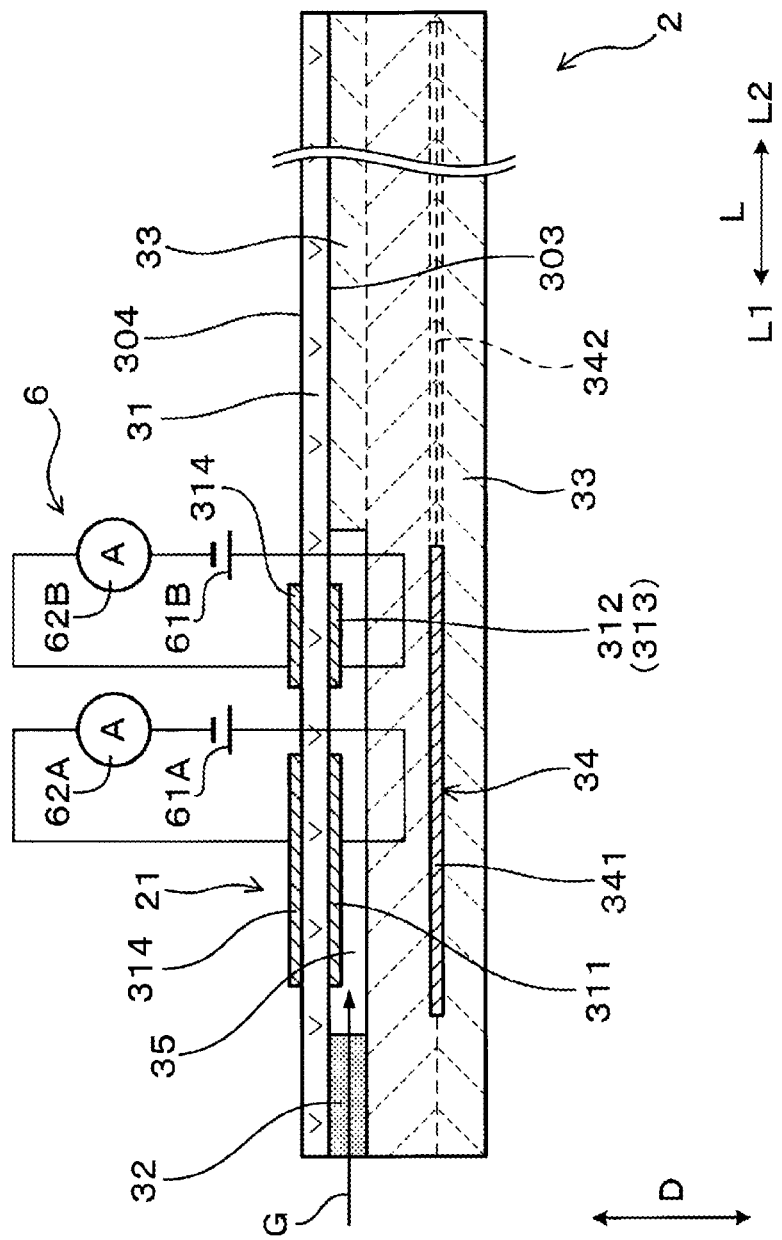
FIG. 10 is a cross-sectional view of a sensor element according to a second embodiment.

According to a present embodiment, as shown in FIG. 10, a sensor element 2 that differs from that according to the first embodiment in a manner in which the electrodes 311, 312, 313, and 314 are provided in the solid electrolyte 31 is described. In the sensor element 2 according to the present embodiment, the reference gas duct 36 into which the reference gas A, such as atmospheric air, is introduced is not formed.

The solid electrolyte 31 of the sensor element 2 according to the present embodiment is arranged on a surface on an outer side of the sensor element 2. The gas chamber 35 is formed between the solid electrolyte 31 and the insulating body 33 in which the heat generating body 34 is embedded. On a surface 303 of the solid electrolyte 31 that is adjacent to the gas chamber 35, the pump electrode 311, the sensor electrode 312, and the monitor electrode 313 are provided. The sensor electrode 312 and the monitor electrode 313 are arranged inside the gas chamber 35 so as to be arrayed in the width direction W. The reference electrode 314 is provided on an outer-side surface 304 of the solid electrolyte 31, in a position overlapping the pump electrode 311, the sensor electrode 312, and the monitor electrode 313 in the lamination direction D.

According to the present embodiment as well, the pump electrode 311 contains Pt, Au, and the solid electrolyte, and the sensor electrode 312 contains Pt, Rh, Au, and the solid electrolyte. In addition, in a manner similar to that according to the first embodiment, the Au content in the surface layer Y of the sensor electrode 312 is higher than the Au content in the reference layer X of the sensor electrode 312.

Other configurations, working effects, and the like of the gas sensor 1 according to the present embodiment are similar to those according to the first embodiment. In addition, the gas sensor 1 according to the present embodiment can be manufactured in a manner similar to that according to the first embodiment. Furthermore, according to the present embodiment as well, constituent elements denoted by reference numbers that are identical to the reference numbers described according to the first embodiment are similar to those according to the first embodiment.

The present disclosure is not only limited to the embodiments. Further differing embodiments are also possible without departing from the spirit of the invention. In addition, the present disclosure includes various modification examples, modification examples within the range of equivalency, and the like. Furthermore, combinations of various constituent elements, modes, and the like that are assumed from the present disclosure area also included in the technical concept of the present disclosure.

What is claimed is:

1. A gas sensor that includes a sensor element, the sensor element comprising:
    a solid electrolyte that has ion conductivity;
    a gas chamber that is formed so as to be adjacent to a surface of the solid electrolyte and into which a gas to be detected is introduced;
    a pump electrode that is provided on the surface of the solid electrolyte in a state in which the pump electrode is housed inside the gas chamber; and
    a sensor electrode that is provided on the surface of the solid electrolyte in a state in which the sensor electrode is housed inside the gas chamber, wherein:
    the pump electrode and the sensor electrode contain Au; and
    Au content in a surface layer is equal to or greater than 1 mass % and higher than Au content in a reference layer, the surface layer being an area from a surface of the sensor electrode to only a depth of 0.3 nanometers, the reference layer being an area located at only depths ranging from 2 or more to 3 or less nanometers beneath the surface of the sensor electrode.

2. The gas sensor according to claim 1, wherein:
the Au content in the surface layer is equal to or greater than two times the Au content in the reference layer.

3. The gas sensor according to claim 1, wherein:
the Au content in the surface layer is within a range of 10 or more to 25 or less mass %.

4. The gas sensor according to claim 2, wherein:
the Au content in the surface layer is within a range of 10 or more to 25 or less mass %.

5. The gas sensor according to claim 1, wherein:
the pump electrode contains Pt and Au; and
the sensor electrode contains Pt, Rh, and Au.

6. The gas sensor according to claim 2, wherein:
the pump electrode contains Pt and Au; and
the sensor electrode contains Pt, Rh, and Au.

7. The gas sensor according to claim 3, wherein:
the pump electrode contains Pt and Au; and
the sensor electrode contains Pt, Rh, and Au.

8. The gas sensor according to claim 4, wherein:
the pump electrode contains Pt and Au; and
the sensor electrode contains Pt, Rh, and Au.

9. A manufacturing method for a gas sensor that includes a sensor element, the sensor element comprising:
a solid electrolyte that has ion conductivity,
a gas chamber that is formed so as to be adjacent to a surface of the solid electrolyte and into which a gas to be detected is introduced,
a pump electrode that is provided on the surface of the solid electrolyte in a state in which the pump electrode is housed inside the gas chamber,
a sensor electrode that is provided on the surface of the solid electrolyte in a state in which the sensor electrode is housed inside the gas chamber, and
a reference electrode that is provided on a surface of the solid electrolyte,
the manufacturing method comprising:
a firing step of firing a sheet of the solid electrolyte on which a paste material for the pump electrode that contains Au, a paste material for the sensor electrode that contains Pt, Rh, and Au, and a paste material for the reference electrode are provided;
an energization step of performing energization between the sensor electrode and the reference electrode; and
a reoxidation step of replenishing the solid electrolyte with oxygen and causing Au to be deposited from inside the sensor electrode toward a surface side, wherein:
in the reoxidation step, Au content in a surface layer is equal to or greater than 1 mass % and higher than Au content in a reference layer, the surface layer being an area from a surface of the sensor electrode to only a depth of 0.3 nanometers, the reference layer being an area located at only depths ranging from 2 or more to 3 or less nanometers beneath the surface of the sensor electrode.

10. The manufacturing method for a gas sensor according to claim 9, wherein:
in the reoxidation step, a temperature of the solid electrolyte is set to 800° C. or more to 1100° C. or less, the sensor electrode is exposed to an inert gas that has an oxygen concentration that is equal to or less than 1 volume % or an inert gas that has a hydrogen concentration of 0.1 or more to 5 or less volume %, and the reference electrode is exposed to atmospheric air and held for a predetermined amount of time.

* * * * *